Aug. 30, 1960
C. K. MYERS
2,950,905
HIGH SPEED MIXING IMPELLER
Filed Sept. 17, 1956
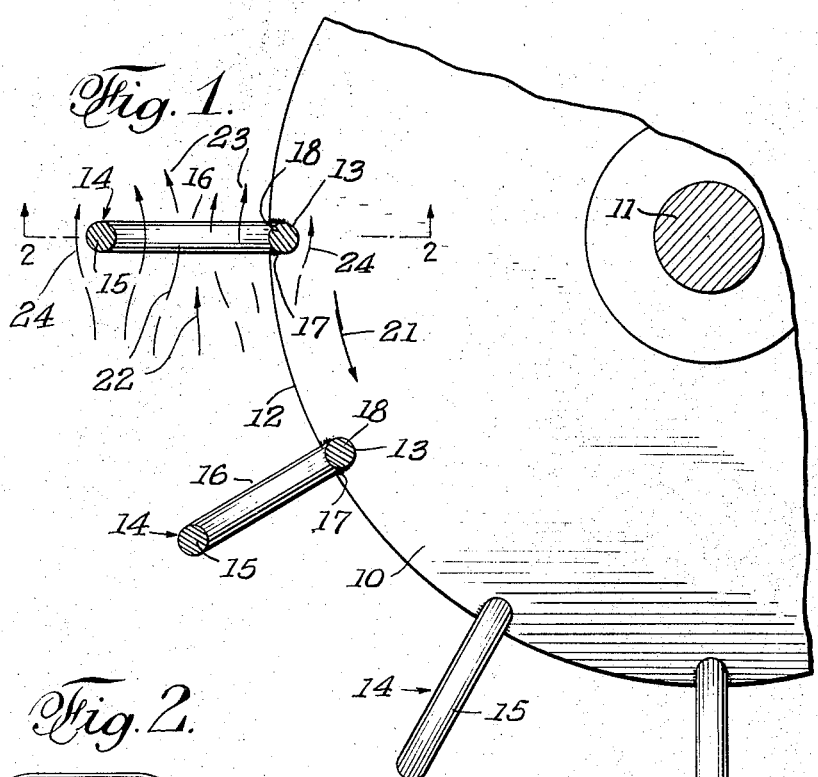
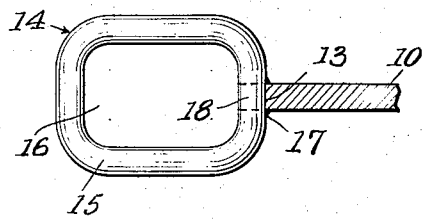
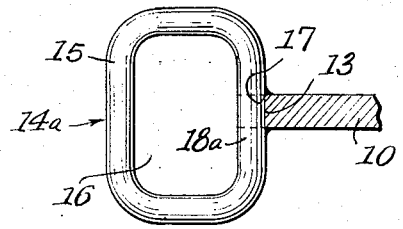
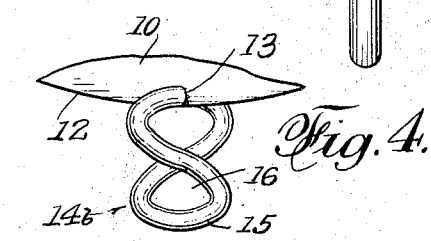
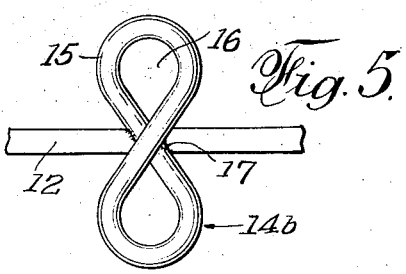
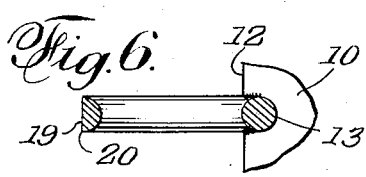
INVENTOR.
CLAUDE K. MYERS
BY E. G. Stratton
ATTORNEY

United States Patent Office 2,950,905
Patented Aug. 30, 1960

2,950,905

HIGH SPEED MIXING IMPELLER

Claude K. Myers, 8376 Salt Lake Ave., Bell, Calif.

Filed Sept. 17, 1956, Ser. No. 610,138

1 Claim. (Cl. 259—134)

This invention relates to a mixing impeller that is adapted to be operated at high speeds.

The present impeller is particularly adapted to mix paints and other like viscous materials in a manner to enable elimination, largely, of milling or grinding operations such as may be needed to insure fine comminution of the material. High speed impellers heretofore used for this type of operation usually comprised peripheral vanes which, although varying in form, size and arrangement, invariably were of the solid or impervious type. Such vanes had certain faults, among which were the formation of a torus-shaped groove or track through highly viscous material with a resultant loss of operating efficiency; need for an excess of power to drive such solid vanes, the same entailing expensive motor and drive apparatus as well as high operating cost of such high-power apparatus; and ineffective mixing primarily because the material, largely, was displaced centrifugally off the outer edges of the vanes.

Another property of high speed impellers, particularly those moving in attritive materials, is high wear rate and resultant short operative life. Heretofore such wear entailed replacement of the entire impeller, since the vanes usually were integrally formed parts of the plate or disc mounting them.

In order to provide an impeller in which the above-listed faults are not present, this invention has for its object to provide an impeller in which the vanes act to alternately expand and compact the mass of material through which they move, thereby obviating formation of a space or track and, therefore, improving mixing efficiency; to provide an impeller that carries out its function at low initial and operating costs and with a power unit that is economical and operates at low cost; to provide an impeller in which the mixing vanes or blades have improved efficiency because the material through which they move is displaced both outwardly and inwardly; and to provide an impeller that has inexpensively formed blades that may be replaced on the mounting plate when the same become worn.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes, preferred embodiments of the present invention, which are given by way of illustration or example only.

In the drawing, like reference characters designate similar parts in the several views.

Fig. 1 is a fragmentary plan view, partly in cross-section, of a high speed mixing impeller embodying one form of the present invention.

Fig. 2 is a cross-sectional view as taken on line 2—2 of Fig. 1.

Fig. 3 is a similar view of a modification.

Fig. 4 is a fragmentary plan view of another modification.

Fig. 5 is a front view of the modification shown in Fig. 4.

Fig. 6 is a plan sectional view of still another form of the invention.

Fig. 1 shows an impeller plate or disc 10, the same being carried by a rotating shaft 11 and driven thereby to have a high peripheral velocity. According to the present invention, the peripheral edge 12 of the plate 10 is formed to have suitably spaced grooves or recesses 13, the same being preferably uniformly peripherally spaced.

The novel elements of the present impeller comprise ring-shaped vane or blade members 14, as in Figs. 1 and 2, 14a as in Fig. 3, and 14b as in Figs. 4 and 5. In practice, such members may comprise conventional chain links or loops and, therefore, may be inexpensively obtained on the open market in the size and form desired. Whether such conventional items or especially fabricated for their present use, the members 14, 14a and 14b comprise a peripheral frame or ring 15 that surrounds an opening 16 of substantial size compared to the over-all size of the member. As shown in Figs. 2 and 3, the frame 15 may be straight-sided with rounded corners and the same may be squarish or, as shown, generally oblong. As shown in Figs. 4 and 5, the frame 15 may have a 45° twist therein so that the same has a figure-eight shape as viewed from the top (Fig. 4) and from the front (Fig. 5). The opening 16 of the latter form has an areal size comparable to the size of the other forms of vane members. It will be noted that the recesses 13 of the latter form of the invention are disposed at an angle to the plate 10 and at a depth commensurate to the thickness of the material from which the frame members 15 are made.

The vane members 14 are shown as affixed to the plate 10 as by a welded connection 17, the same welding one of the shorter sides 18 of frame 15 in a groove 13 so that the member has a radial disposition substantially as shown. A similar weld 17 affixes a longer side 18a of member 14a to the disc or plate 10. The same type of weld may be used to affix vane member 14b. Mounted in this manner, the vane member, when worn, may be removed from the grooves 13 in which positioned and replaced by new members that are welded in position.

All of the vane members on a plate 10 may be the same or every other one may be the same and alternate ones different. Thus, vanes 14 and 14a may be alternately arranged on a plate, or such and other ring-shaped vanes may be used in any desired arrangement.

Further, the frames may be round-sectioned or the same may have other sectional form, either initially provided or produced by grinding, as at 19 of Fig. 6. Thus, the frames may have a flat-sided presentation to the material being mixed, or may have edges 20 that may cut through the material, as desired.

It will be understood that, with the impeller rotating in the direction of arrow 21, the vanes move through material in a manner to cause the same to be compressed when passing through openings 16, as exemplified by the arrows 22, the material then expanding after leaving openings 16, as shown by arrows 23. Further, the frames 15 displace material outwardly, as indicated by arrows 24. Thus, the material being mixed is alternately contracted or compacted and expanded in the manner contemplated. As the circular plate 10 rotates, the loop blade openings 16 surround the material within the path of the blade, the arrows 22 surrounded by the openings 16 representing the relative flow lines of the material with respect to the openings 16. The operation, although efficient, is nevertheless accomplished with little power because only the relatively small-area frame 15 is moved through the mixture.

By combining this action with cutting actions as may be produced by edges 20, a highly efficient mixing of viscous materials is effected at high speed and at low initial and operating costs.

While the foregoing has illustrated and described what are now contemplated to be the best modes of carrying out my invention, the constructions are, of course, subject to modification without departing from the spirit and scope of the invention. It is, therefore, not desired to restrict the invention to the particular forms of construction illustrated and described, but to cover all modifications that may fall within the scope of the appended claim.

Having thus described my invention, what I claim and desire to secure by Letters Patent is:

A mixing impeller comprising a rotating shaft, a plate fixedly mounted on said shaft and disposed normal thereto, said plate having a circular peripheral edge generated on the axis of the shaft, a plurality of uniformly spaced open recesses formed in said peripheral edge, said recesses being disposed at an angle to the plane of the plate, a mixing vane member fixedly mounted in each said recess and formed as a frame with one side of said frame entirely disposed in the recess and at the angle of said recess and each frame having an opposite side beyond the periphery of the plate disposed at a reverse angle to the angle of the frame side in the recess, said oppositely angled frame sides moving bodily with the plate around the axis of the rotating shaft in different concentric circular paths, each frame having upper and lower frame sides connecting the mentioned angularly disposed frame sides.

References Cited in the file of this patent

UNITED STATES PATENTS

| | | |
|---|---|---|
| 120,849 | Broyhill et al. | Nov. 14, 1871 |
| 233,287 | Schmidt | Oct. 12, 1880 |
| 802,199 | Cross | Oct. 17, 1905 |
| 802,972 | Carpenter | Oct. 31, 1905 |
| 806,616 | Anderson | Dec. 5, 1905 |
| 1,227,327 | Shaeffer | May 22, 1917 |
| 1,279,515 | Coleman | Sept. 24, 1918 |
| 1,392,789 | Paris | Oct. 4, 1921 |
| 1,402,813 | Vogt | Jan. 10, 1922 |
| 1,479,511 | Parsons | Jan. 1, 1924 |
| 1,918,738 | Burrell | July 18, 1933 |
| 2,384,952 | Miller | Sept. 18, 1945 |
| 2,552,057 | Paik | May 8, 1951 |
| 2,689,682 | Boyd et al. | Sept. 21, 1954 |
| 2,697,589 | Davey | Dec. 21, 1954 |